Patented Mar. 14, 1933

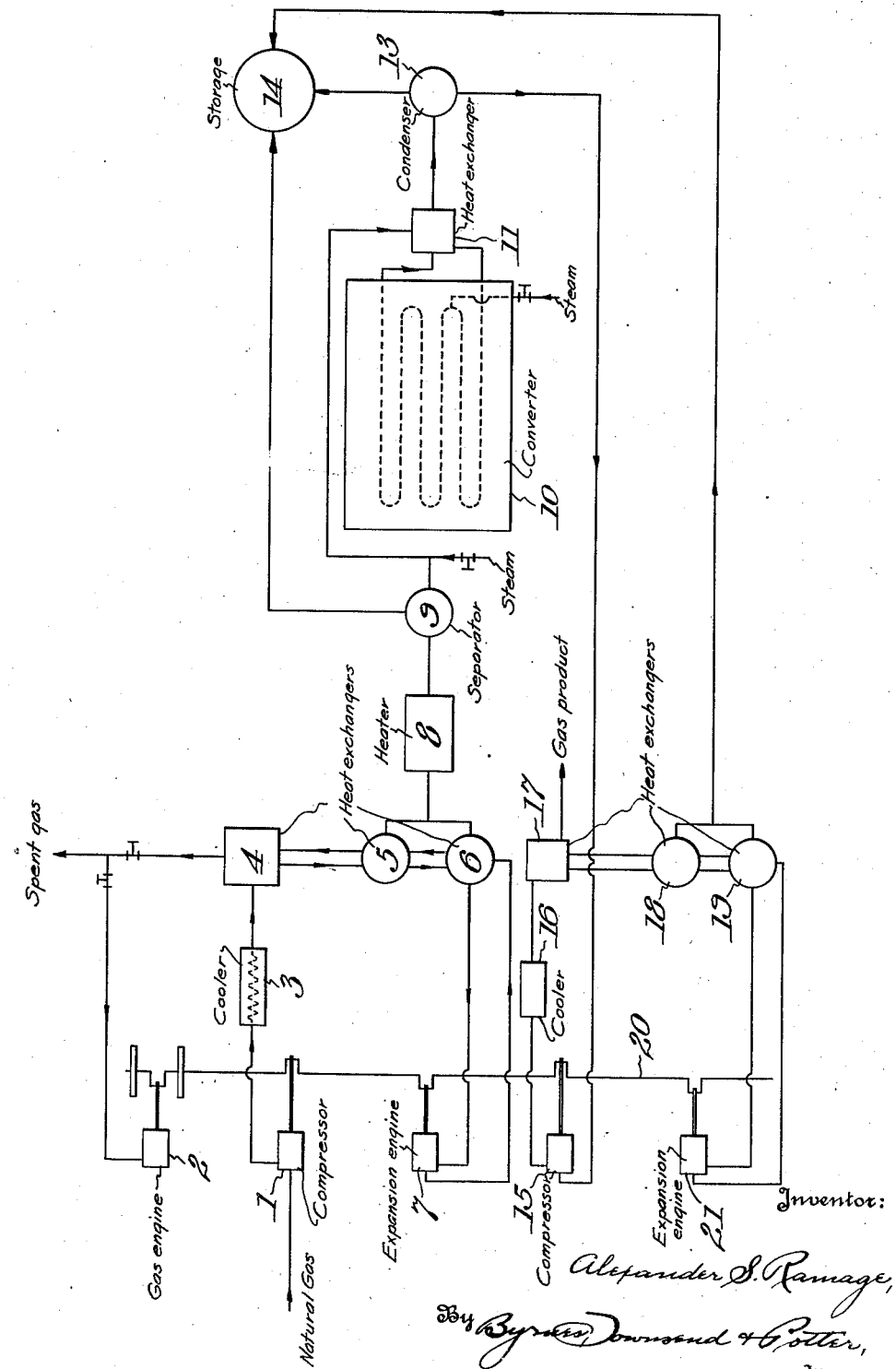

1,900,997

UNITED STATES PATENT OFFICE

ALEXANDER S. RAMAGE, OF DETROIT, MICHIGAN, ASSIGNOR, BY MESNE ASSIGNMENTS, TO MERLIN WILEY AND ORA L. SMITH, TRUSTEES, OF DETROIT, MICHIGAN

PROCESS FOR THE CONVERSION OF GASEOUS PARAFFIN OR OLEFINE HYDROCARBON INTO LIQUID AROMATIC HYDROCARBONS

Application filed May 21, 1930. Serial No. 454,493.

The primary object of the present invention is the conversion of wild natural gas gasoline into a stable product suitable for transportation under conditions ordinarily encountered, i. e., at temperatures up to, say, 120° F. Another object of the invention is the conversion of gaseous and highly volatile constituents of the natural gasoline such as ethane, propane, butane, pentane, hexane and heptane into liquid products, including aromatic hydrocarbons, which are highly desirable and quite stable in the resulting gasoline product.

In my United States Patent No. 1,752,692, patented April 1, 1930, I have disclosed a process according to which relatively heavy hydrocarbons, i. e., normally liquid hydrocarbons, are converted into products consisting principally of permanent gases suitable for use in heating and illumination, and a liquid comprising aromatic hydrocarbon compounds, by passing the vapors of the liquid hydrocarbon admixed with steam over ferric oxide and contacting the resulting products admixed with more steam with metallic iron at an elevated temperature, both products being generally more volatile than the starting material. The results of the process of my present invention are the reverse of those of the process of the patent, i. e., according to the present invention, I start with a highly volatile or wild product and produce from it a stable liquid product.

In producing gasoline from natural gas it was quite common practice to liquefy the gasoline by extreme cold and pressure. This method has been largely replaced by the absorption method, owing to the fact that the liquid produced by the cold and pressure method is extremely wild and had to be weathered before it could be shipped, losing as high as 50 to 60% of its volume. Even the liquid produced by the absorption method has to be stabilized before shipping.

In my process I prefer to employ the old method of liquefaction by cold and pressure, although I may take the liquid produced by the absorption method, and pass it through a heater in which it is heated up to 120° F. or higher, if desired, and then discharged into an evaporator or separator. The liquid part at, say, 120° F. is run at once to storage tanks. The gaseous part is passed through a heat interchanger comprising tubes partially filled with ferric oxide, together with an addition of about 2 to 5% of steam, and is preheated to about 800 to 900° F. by heat interchange with the vapors issuing from the converter through which the heated vapors subsequently pass. This converter is fitted with tubes filled with ferric oxide and double the number of tubes filled with iron turnings or borings or finely divided iron. The preheated vapors, together with the 2 to 5% steam, pass through the ferric oxide tubes heated to 1000 to 1100° F., then with a further addition of steam, bringing the total up to about 15%, through the tubes filled with metallic iron and heated to 1300° F. On issuing from the converter the vapors pass through the heat interchanger and then through a condenser where there is produced a condensate consisting principally of aromatic hydrocarbons, such as benzol, toluol, xylol, and higher homologues, and about 20% of the higher alcohols, and a gas that contains no olefines other than ethylene amounting to from 30 to 40%, the balance being principally hydrogen with some carbon monoxide and a little methane, and uncondensed vapors of aromatic hydrocarbons and light condensible liquids. The amount of liquid condensate runs about 60 to 70% of the weight of the gaseous paraffin hydrocarbons passed through the converter.

The condensate is entirely free from sulphur and gum-forming materials and can be added at once to the stabilized gasoline in the storage tanks.

The ethylene can be condensed from the gas and either used as such or run into the bottom of the gasoline-aromatic hydrocarbon mixture in the storage tanks. The ethylene seems to polymerize on contact with the gasoline-aromatic hydrocarbon mixture and gives a quite stable product. However, on distilling the mixture the polymerized ethylene splits up again at about 250° F. into gaseous ethylene. This mixture of gasoline, aromatic hydrocarbons, higher alcohols and polymerized ethylene forms an ideal motor fuel for high compression engines up to 10 to 1 compression ratio. The ethylene containing gas may also be washed with oil in the usual absorption plant and the distillate from the wash oil added to the condensate, or the gas can be fractionally liquefied by compression and cooling in the usual way and the first fraction can be added to the condensate.

The ferric oxide becomes gradually converted to ferrous oxide and at the same time any sulphur compounds in the vapors are decomposed, forming ferrous sulphide. Therefore, it is necessary at intervals to revivify it by blowing air over it. The ferrous oxide burns to ferric oxide and the ferrous sulphide also burns to ferric oxide and sulphur dioxide.

As an example of the process: I pass 2000 gallons of the liquefied product from natural gas from Mid-Continent fields, liquefied by extreme cold and pressure, through a heater heated by steam or other means to 120° F. to 150° F., and expand same in the usual expanding tower, the liquid product, about 1000 gallons, running off into the gasoline storage tanks, and the gaseous product, amounting also to about 1000 gallons, passing directly through a heat interchanger together with 2 to 5% steam into the converter at a temperature of from 800 to 900° F. In the converter the vapors pass through the ferric oxide manifolds at 1000 to 1100° F. and thence, together with more superheated steam to bring the amount of steam up to about 15% by weight of the hydrocarbon gases, through the manifolds containing the metallic iron at a temperature from 1200 to 1300° F. The issuing vapors pass through the heat interchanger and then to a condenser. The condensate passes to the gasoline storage tank and the uncondensed gas to a liquefaction plant fitted with two heat interchangers. In the first interchanger the benzol and aromatic product separate out and in the second the ethylene is liquefied. The benzol mixture is run into the gasoline tank. The gasoline and condensed benzol mixture from the condenser form all together about 1600 gallons and the liquid ethylene, amounting to about 200 gallons, can be run into steel tanks or blended with the gasoline-benzol mixture for very high compression motor fuel.

The accompanying drawing is a diagrammatic illustration of apparatus suitable for carrying out the process described above.

Referring to the drawing, 1 is a compressor to compress the natural gas to, say, 250 pounds. 2 is a gas engine run by stripped gas and driving line shaft 20. 3 is a wash cooler to cool the compressed gas. 4, 5 and 6 are heat exchangers to further cool the compressed gas by means of the cold expanded gas. 7 is an expanding engine doing external work on line shaft 20. 8 is a heater to raise the liquids to 120 to 150° F. by means of steam or burning some stripped gas. 9 is an expander for separating the liquid which goes to the gasoline tank 14, and the gases which go to the heat exchanger 11 together with about 2 to 5% steam, passing through the tubes of the heat exchanger which are partially filled with ferric oxide and heated externally by the issuing gases from the converter. 10 is a converter. The vapors from converter 10 pass through heat exchanger 11 to condenser 13. The condensed product from 13 goes to gasoline tank 14, and the gases to a compressor 15, then to water cooler 16, then heat exchangers 17, 18 and 19, then to expanding engine 21, the cool expanded gases returning through heat exchangers 19, 18 and 17.

The apparatus described forms no part of the present invention, but merely represents one form of apparatus suitable for carrying out the process.

The principal points to be observed in the process are: First, to revivify the iron oxide at such intervals that it never becomes reduced further than the ferrous state, and that the sulphur extracted from the gases never amounts to more than 2% of the oxide before revivification; otherwise the ferrous sulphide is apt to fuse and render the mass difficult to reoxidize. Second, that the amount of superheated steam is so regulated, together with the olefinic gases, that the iron always remains in the metallic state. Third, that the length of travel of the gases over the metallic iron shall be at least twice that over the ferric oxide. The flow of gases through the tubes can be regulated by the specific gravity of the condensate which should not be over 40° Bé. or by the gases which should contain practically no olefines, but ethylene, and the ethylene content should be preferably about 30 to 40%.

I claim:

1. Process which comprises separating wild natural gasoline into a stable liquid portion and a highly volatile portion, passing the highly volatile portion admixed with steam over and in contact with ferric oxide at a temperature approaching about 1100° F., passing the resulting vapors admixed with more steam over and in contact with an extended surface of metallic iron at a temperature approaching about 1300° F., cooling the resulting gases and condensing a portion thereof, and blending the condensate with the stable liquid portion of the natural gasoline.

2. Process which comprises separating wild natural gasoline into a stable liquid portion and a highly volatile portion, heating the highly volatile portion admixed with about 2 to 5% of steam up to a temperature of 800° F. to 900° F. by contact with a heated mass of ferric oxide, contacting the resulting vapors with ferric oxide at a temperature of about 1000° F. to 1100° F., adding steam to the resulting vapors to bring the total amount up to about 15%, and contacting the mixture with an extended surface of metallic iron at about 1200° F. to 1300° F., subjecting the resulting gases to partial condensation, and mixing the condensate with the stable portion of the natural gasoline.

3. Process which comprises passing the highly volatile and normally gaseous constituents of natural gas gasoline admixed with steam successively over and in contact with a mass of ferric oxide and a mass of iron presenting a large surface, at a temperature of at least about 1000° F., and regulating the quantity of admixed steam to maintain the iron in its metallic state.

4. Process which comprises passing gaseous and highly volatile paraffin hydrocarbons admixed with about 2 to 5% of steam in contact with ferric oxide at a temperature of from 800° F. to 1100° F., adding to the resulting gases sufficient steam to make a total of about 15% calculated on the quantity of hydrocarbons originally taken, and contacting the resulting mixture with metallic iron at a temperature of about 1200° F. to 1300° F.

5. Process which comprises passing normally gaseous and highly volatile normally liquid paraffin hydrocarbons admixed with steam successively in contact with ferric oxide and metallic iron at temperatures of from 800° F. to 1300° F., and controlling the operating conditions so that the normally liquid portion of the resulting product will have a specific gravity of about 40° Bé. and will consist principally of compounds of the aromatic series and the normally gaseous portion of said product will contain about 30% to 40% of ethylene and no other olefine in substantial amount.

6. Process which comprises separating wild natural gas gasoline into a stable liquid portion and a portion consisting of normally gaseous and highly volatile components, passing the latter portion admixed with steam successively in contact with ferric oxide at a temperature up to about 1000° F. and metallic iron at a temperature up to about 1300° F., cooling the resulting gases and vapors and mixing the condensate with the stable liquid portion of the natural gas gasoline, and bubbling the uncondensed gases up through the mixture.

In testimony whereof, I affix my signature.

ALEXANDER S. RAMAGE.